United States Patent
Kountanis

(10) Patent No.: US 11,294,684 B2
(45) Date of Patent: Apr. 5, 2022

(54) INDIRECT BRANCH PREDICTOR FOR DYNAMIC INDIRECT BRANCHES

(71) Applicant: Apple Inc., Cupertino, CA (US)

(72) Inventor: Ian D. Kountanis, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 26 days.

(21) Appl. No.: 16/778,913

(22) Filed: Jan. 31, 2020

(65) Prior Publication Data
US 2021/0240476 A1  Aug. 5, 2021

(51) Int. Cl.
  *G06F 9/38* (2018.01)
  *G06F 9/30* (2018.01)

(52) U.S. Cl.
  CPC .......... *G06F 9/3844* (2013.01); *G06F 9/3806* (2013.01); *G06F 9/3848* (2013.01); *G06F 9/30058* (2013.01)

(58) Field of Classification Search
  CPC .... G06F 9/3844; G06F 9/3848; G06F 9/3806; G06F 9/30058
  See application file for complete search history.

(56) References Cited

U.S. PATENT DOCUMENTS

| | | | |
|---|---|---|---|
| 6,721,877 B1 | 4/2004 | Chen et al. | |
| 7,707,397 B2* | 4/2010 | Henry | G06F 9/3844 712/239 |
| 8,555,040 B2 | 10/2013 | Beaumont-Smith et al. | |
| 8,782,384 B2 | 7/2014 | Suggs et al. | |
| 9,983,878 B2 | 5/2018 | Levitan et al. | |
| 10,318,304 B2 | 6/2019 | Manoukian | |
| 2001/0021974 A1 | 9/2001 | Lee | |
| 2011/0078425 A1 | 3/2011 | Shah et al. | |
| 2011/0289300 A1 | 11/2011 | Beaumont-Smith | |
| 2011/0320787 A1 | 12/2011 | Dieffenderfer et al. | |
| 2012/0079255 A1 | 3/2012 | Combs | |
| 2012/0124347 A1* | 5/2012 | Dundas | G06F 9/3804 712/239 |
| 2013/0151823 A1 | 6/2013 | Beaumont-Smith | |

(Continued)

OTHER PUBLICATIONS

U.S. Appl. No. 16/778,939, Office Action, dated Aug. 9, 2021, 35 pages.

*Primary Examiner* — Courtney P Carmichael-Moody
(74) *Attorney, Agent, or Firm* — Kowert, Hood, Munyon, Rankin & Goetzel, P.C.; Lawrence J. Merkel

(57) ABSTRACT

In an embodiment, an indirect branch predictor generates indirect branch predictions for indirect branch instructions. For relatively static branch instructions, the indirect branch predictor may be configured to use a PC corresponding to the indirect branch instruction to generate a target prediction. The indirect branch predictor may be configured to identify at least one dynamic indirect branch instruction and may use a different PC than the PC corresponding to the indirect branch instruction to generate the target prediction (e.g. the most recent previous PC associated with a taken branch ("the previous taken PC"). For some dynamic indirect branch instructions, the previous taken PC may disambiguate different target addresses (e.g. there may be a correlation between the previous taken PC and the target address of the indirect branch instruction).

20 Claims, 8 Drawing Sheets

(56) References Cited

U.S. PATENT DOCUMENTS

| | | | |
|---|---|---|---|
| 2014/0089647 A1* | 3/2014 | Kountanis | G06F 9/38 |
| | | | 712/240 |
| 2014/0281441 A1* | 9/2014 | Manoukian | G06F 9/3848 |
| | | | 712/239 |
| 2020/0050459 A1* | 2/2020 | Palivela | G06F 11/3466 |
| 2020/0133678 A1 | 4/2020 | Gellerich | |
| 2021/0004234 A1* | 1/2021 | Hu | G06F 9/3844 |

* cited by examiner

INDIRECT BRANCH PREDICTOR FOR DYNAMIC INDIRECT BRANCHES

BACKGROUND

Technical Field

Embodiments described herein are related to processors and, more particularly to indirect branch prediction in processors.

Description of the Related Art

High performance processors implement branch prediction in order to speculate beyond branch instructions and identify additional instructions for execution based on the prediction. There are various forms of branch prediction. For example, branch direction prediction is used to predict conditional branches, which are either taken (instruction execution continues at a branch target address specified by the branch instruction) or not taken (instruction execution continues at a next sequential address to the fetch address of the branch instruction). Indirect branch instructions have a branch target address that is at least partially determined from the contents of a register (as compared to other branch instructions, which determine a branch target address based on one or more of the fetch address of the branch instruction, an offset specified by the branch instruction in a displacement or immediate field, etc.). Indirect branch predictors attempt to predict the branch target address of indirect branch instructions. A branch target address may be more succinctly referred to herein as a "target address," a "branch target," or a "target."

Many indirect branch instructions are relatively static, having one target address or a few different target addresses during execution. Such indirect branch instructions can be fairly accurately predicted using the fetch address of the indirect branch instruction (also referred to as the program counter (PC) of the instruction) and some branch history. Other indirect branch instructions are more dynamic, having numerous target addresses during execution and switching among the various target addresses frequently. The more dynamic indirect branch instructions are much more difficult to predict, and are frequently mispredicted by typical indirect branch predictors. If a particular dynamic indirect branch instruction is also frequently executed, performance of the processor can be significantly impacted.

SUMMARY

In an embodiment, an indirect branch predictor generates indirect branch predictions for indirect branch instructions. For relatively static branch instructions, the indirect branch predictor may be configured to use a PC corresponding to the indirect branch instruction to generate a target prediction. The PC may be the PC of the indirect branch instruction, a PC used to fetch a group of instructions including the indirect branch instruction, etc. The indirect branch predictor may be configured to identify at least one dynamic indirect branch instruction and may use a different PC than the PC corresponding to the indirect branch instruction to generate the target prediction. For example, the most recent previous PC associated with a taken branch ("the previous taken PC") may be used. For some dynamic indirect branch instructions, the previous taken PC may disambiguate different target addresses (e.g. there may be a correlation between the previous taken PC and the target address of the indirect branch instruction). In such cases, the use of the previous taken PC may improve the accuracy of the prediction for the dynamic indirect branch instruction.

BRIEF DESCRIPTION OF THE DRAWINGS

The following detailed description makes reference to the accompanying drawings, which are now briefly described.

Figure 1:
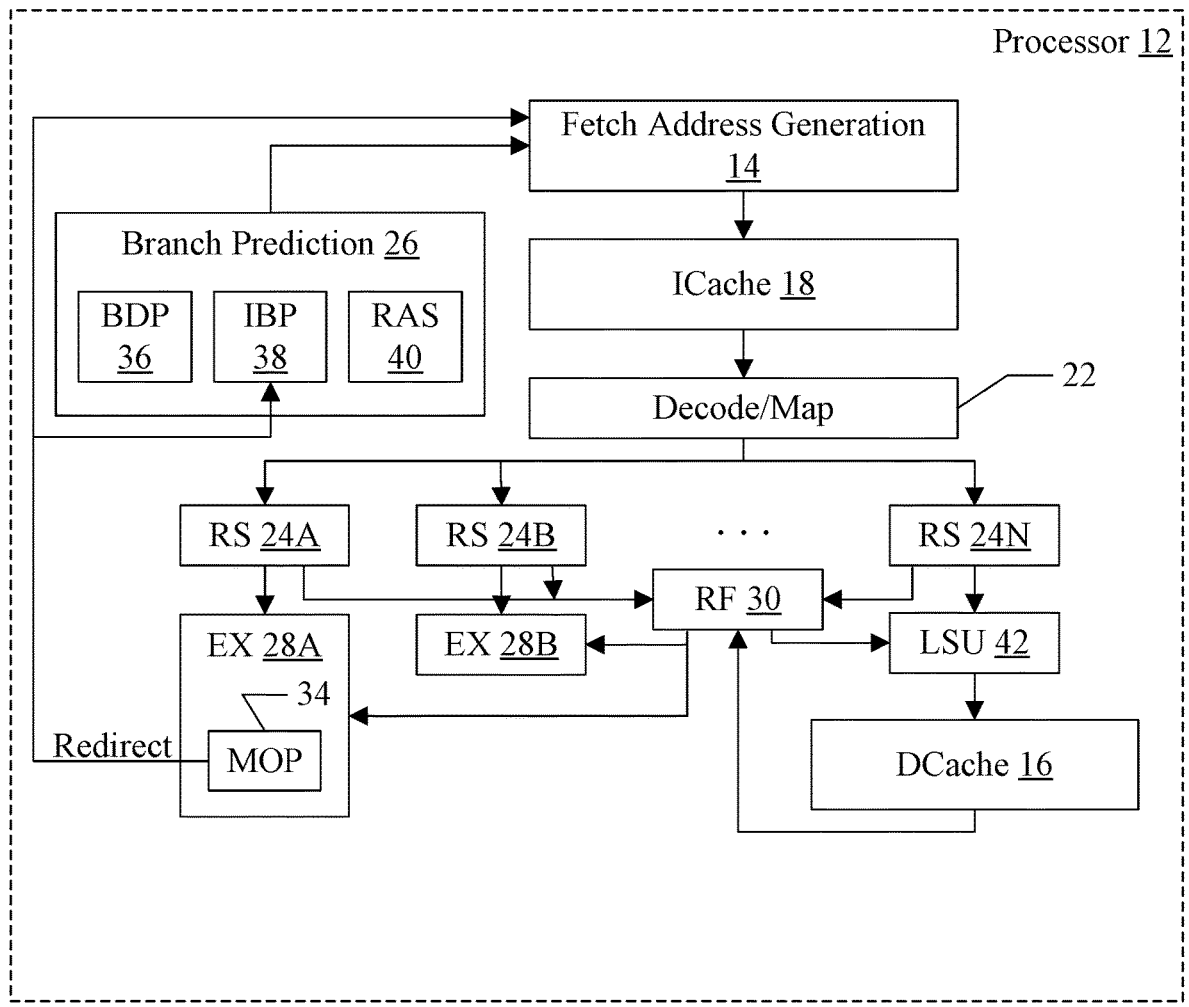
FIG. 1 is a block diagram of one embodiment of a processor including an indirect branch predictor (IBP).

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be said to be "configured" to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

This specification may use the words "a" or "an" to refer to an element, or "the" to refer to the element. These words are not intended to mean that there is only one instance of the element. There may be more than one in various embodiments. Thus, "a", "an", and "the" should be interpreted to mean "one or more" unless expressly described as only one.

This specification may describe various components, units, circuits, etc. as being coupled. In some embodiments, the components, units, circuits, etc. may be coupled if they are electrically coupled (e.g. directly connected or indirectly connected through one or more other circuits) and/or communicatively coupled.

DETAILED DESCRIPTION OF EMBODIMENTS

Turning now to FIG. 1, a block diagram of one embodiment of a processor 12 is shown. In the illustrated embodiment, the processor 12 includes a fetch address generation circuit 14, an instruction cache ("ICache") 18, a decode/map unit 22, a branch prediction unit 26 (including a branch direction predictor (BDP) 36, an indirect branch predictor (IBP) 38, and a return address stack (RAS) predictor 40), one or more reservation stations 24A-24N, one or more execution units 28A-28B, a register file 30, a data cache ("DCache") 16, and a load/store unit (LSU) 42. The execution unit 28A includes a method/object predictor (MOP) 34. The MOP 34 may be another indirect branch predictor, as discussed in more detail below.

The fetch address generation circuit 14 is coupled to the ICache 18, which is coupled to the decode/map unit 22, which is coupled to the reservation stations 24A-24N. The reservation stations 24A-24B are coupled to the execution units 28A-28B as shown in FIG. 1, and the reservation station 24N is coupled to the LSU 42. The reservation stations 24A-24N are also coupled to the register file 30, which is coupled to the execution units 28A-28B and the LSU 42. The LSU 42 is also coupled to the DCache 16, which is coupled to the register file 30. The branch prediction unit 26 is coupled to the fetch address generation circuit 14. The MOP 34 is configured to provide a redirect to the fetch address generation circuit 14 and the IBP 38 in the illustrated embodiment.

The fetch address generation circuit 14 may be configured to generate fetch addresses (fetch PCs) to fetch instructions from the ICache 18 for execution by the processor 12. The fetch address generation circuit 14 may implement various prediction structures to predict the fetch path. For example, a next fetch predictor may be used to predict fetch addresses based on previously executed instructions. In such an embodiment, the branch prediction unit 26 may be used to verify the next fetch prediction. Alternatively, the branch prediction unit 26 may be used to predict next fetch addresses, if the next fetch predictor is not used.

In the illustrated embodiment, the branch prediction unit 26 includes various branch predictors such as the BDP 36, the IBP 38, and the RAS 40. Other embodiments may include any subset of the above branch predictors and/or other predictors. The BDP 36 may be configured to predict the taken/not taken result for conditional branches. Based on the taken/not taken result, the next fetch address may be either the branch target address or the next sequential address. The target address may be the address specified by the branch instruction (or more briefly, branch) to which fetching is to be directed when the branch is taken (or is always the location to which fetching is to be directed, for unconditional branches). The next sequential address may be the address that numerically follows the PC of the branch, and may be the next fetch address if the branch is not taken (similar to non-branch instructions, which are fetched in sequential order). The RAS 40 may predict the next fetch addresses for return instructions, based on previous call instructions. The call and return instructions may be used, e.g. to call and return from subroutines/functions, etc. The call instruction may push a return address on the stack (e.g. to the next sequential instruction after the call), and the return instruction may pop the top of the stack to generate the return address. The stack may be in memory, or may be simulated via a register written by the call instruction and read by the return instruction.

The indirect branch predictor 38 may predict the target address of an indirect branch instruction. The indirect branch predictor 38 may include one or more memories that store previously-generated indirect branch targets. The memories may be indexed by the PC corresponding to the indirect branch instruction (or a portion of the PC), and/or a hash of the PC and some number of branch history bits. Any type of branch history may be used. For example, the branch history may be a history of recent taken and not-taken branches, with each branch represented by a set bit for taken and a clear bit for not taken or vice versa. As branches are encountered, the history may be updated with the most recent taken/not taken bit and the oldest history bit may be discarded, e.g. by shifting the bits. In another example, one or more bits of PC may be used as branch history. Combinations of the above, and/or any other branch history, may be used in various embodiments.

In an embodiment, the IBP 38 may be a Tagged Geometric (TAGE)-style branch predictor which has multiple memories. A base memory may be indexed by the PC or a hash of the PC, and other memories may be indexed by the PC hashed with different amounts of branch history. The base memory may not be tagged, but the other memories may be tagged. If a tag hit is detected in one or more of the other memories, the branch target address may be predicted to be the target address from the memory that is indexed with the largest amount of history and that is also a tag hit for the branch. If no tag hit is detected, the branch target address may be predicted to be the target address from the base memory. Other embodiments may implement other types of indirect branch predictors 38. For example, a single table indexed by branch PC and branch history, or simply branch PC, may be used. A single tagged table may be used.

As mentioned previously, the MOP 34 may be also be an indirect branch predictor. The MOP 34 may be used to verify and/or more accurately predict the branch target address for dynamic indirect branch instructions (e.g. indirect branch instructions that have a larger number of unique targets during execution, as compared to other indirect branch instructions). The MOP 34 may use different and/or additional information to predict the indirect branch instructions. For example, in an embodiment, the MOP 34 may use register values (e.g. the contents of one or more registers) to predict the indirect branch instruction. The indirect branch instruction may be dependent, directly or indirectly, on the register values for the generation of the target address. For example, in one embodiment, the register values may be from registers that are sources of one or more load instructions that read memory locations from which the indirect branch target address is derived. One or more of the register values may be used to generate the address of the memory location read by the load. In an embodiment, the register values may include values from registers that are a target of a load instruction. The target register may receive the data read from the memory location. Such target registers may also be the source registers of other loads that affect the generation of the indirect branch target address. Register values used by the MOP 34 may include values from register that are the target of other instructions which depend on the load instructions. In other embodiments, the indirect branch instruction may be directly dependent on one or more of the register values. The indirect branch instruction may be directly dependent on a previous instruction if the target register of the previous instruction is a source register of the indirect branch instruction. The indirect branch instruction may be indirectly dependent on a previous instruction if the target register of the previous instruction indirectly affects the generation of the source register for the indirect branch instruction (e.g. the source register is the target of an instruction having a source register directly dependent on the previous instruction, or indirectly dependent on the previous instruction through one or more other instructions).

The processor 12 may detect the dynamic indirect branches in various fashions. For example, the processor 12 may monitor the behavior of various indirect branches (e.g. by fetch PC of the indirect branches) to detect instances of indirect branches that frequently change the branch target address among multiple different indirect branches. In other embodiments, the indirect branch instructions may be identified by software (e.g. by programming data in configuration registers in the IBP 38, discussed in more detail below) to permit the processor 12 to detect such indirect branches.

Figure 2:
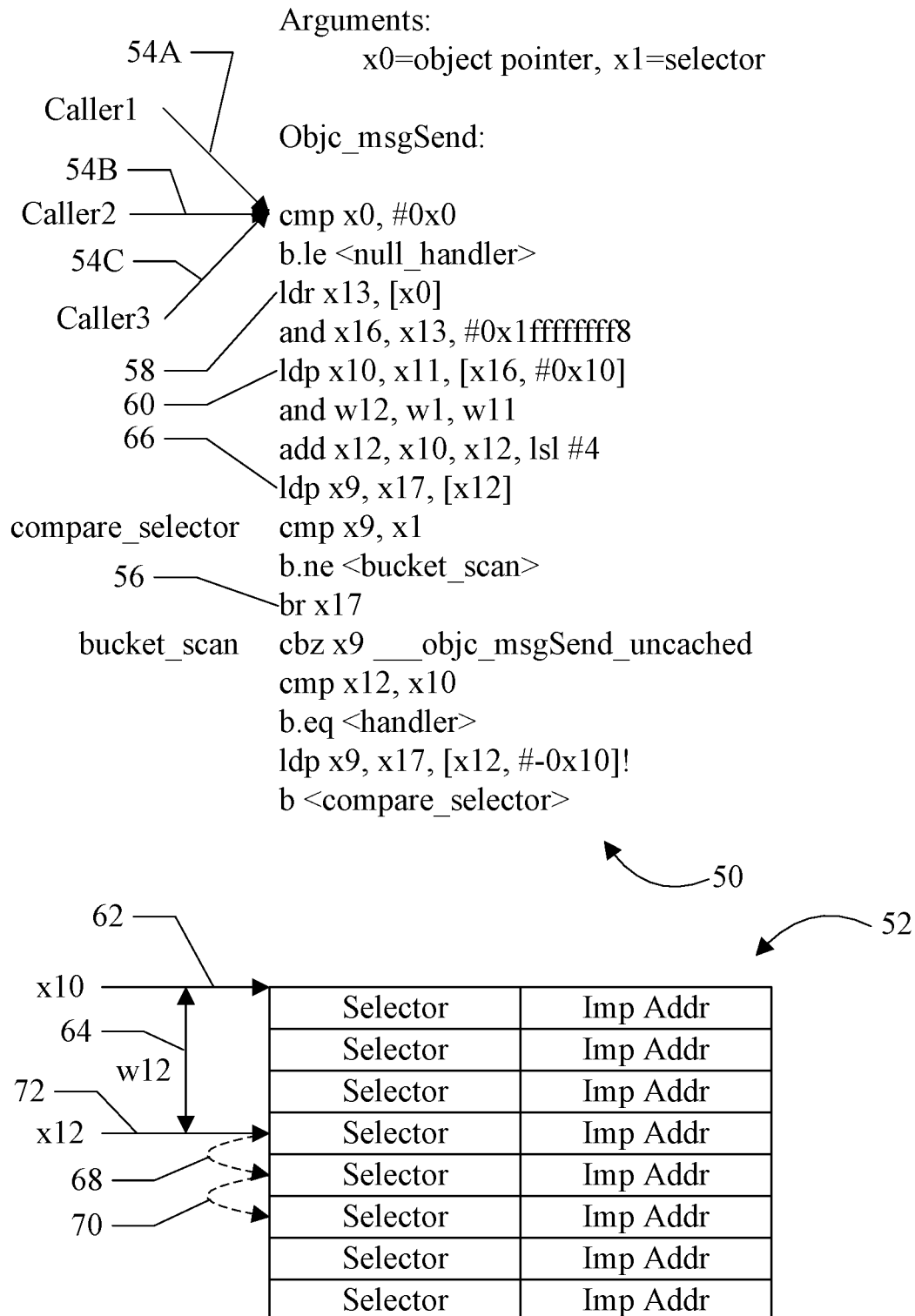
FIG. 2 is a block diagram of one embodiment of a method/object mapping function.

In one embodiment, a specific indirect branch accounts for a high percentage of the indirect branch mispredictions. The indirect branch is a branch used in the objective C message send function call. Objective C uses the C programming language, but also includes an object-orientated structure. Objective C is class-based, and each class has objects. The class defines the object's behavior, e.g. such as data types and methods that operate on the data. The methods are resolved at runtime. Accordingly, a program in objective C sends a message to a method using the method name and object name. The object name maps to the class, and a table for the given class includes a mapping of the method name to an address at which the method implementation (the code sequence that implements the method) is stored. The message send routine looks up the table, and terminates with an indirect branch to the address read from the method table. The terminating indirect branch may thus be an indirect branch with many different targets during use. FIG. 2 is an example of the objective C message send routine, and will be described in more detail below.

There may be a correlation between the caller of the objective C message send routine and the target address of the terminating indirect branch. That is, a given caller may frequently be sending a message to the same method of a given object (or objects within the same class). In one embodiment, the IBP 38 may be designed to take advantage of the correlation, and may be programmed with data that identifies the terminating indirect branch of the objective C message send routine. In such an embodiment, the IBP 38 may use an alternate fetch address (PC) to predict the terminating indirect branch instruction. For example, the previous taken PC (which may be the PC of the call instruction that called the objective C message send routine) may be used as the PC used to predict the terminating indirect branch. Other indirect branch instructions may be predicted using the PC corresponding to the indirect branch itself. For example, relatively static indirect branch instructions may use the current PC corresponding to the indirect branch instruction itself, while dynamic indirect branch instructions such as the terminating indirect branch of the objective C message send routine may use the previous PC or previous taken PC.

While previous taken PC is used as the alternate PC to generate indirect branch target predictions for the dynamic indirect branch instructions as discussed above, other embodiments may use other alternate PCs. For example, since the objective C message send routine is a subroutine/function, call instructions may be used to call the routine. Thus, the top of stack address from the RAS predictor 40 may be related to the previous PC and may be used to form a prediction. In another embodiment, a dedicated RAS predictor may be implemented by the IBP 38 for the objective C message send routine, to be used for the terminating indirect branch. In still other embodiments that use multi-table indirect predictors like the TAGE-style predictor mentioned above, different alternate PCs may be used for different subsets of the memories.

Viewed in another way, the IBP 38 may be configured to modify the indexing into the indirect prediction memories for the more dynamic indirect branch instructions such as the terminating indirect branch instruction of the objective C message send routine, as compared to the indexing used for more static indirect branch instructions. The modification may take the form of selecting an alternate PC to input to the index generation, as discussed above. Other embodiments may change the index operation itself, or make any other modification to the indexing that may improve the accuracy for predicting the dynamic indirect branches.

When the MOP 34 is used, the MOP 34 may generate a prediction, and compare the prediction to the prediction generated by the IBP 38. If the predictions mismatch (e.g. a miscompare is detected), the MOP 34 may signal a redirect to the fetch address generation circuit 14 to cause instruction fetching to be redirected to the newly-predicted target address. By redirecting the fetch to the newly-predicted (and more accurate) target address, performance may be improved by more rapidly reaching the correct target instructions. The IBP 38 may optionally be informed of the redirect as well, to capture the newly-predicted target address for training. Alternatively, the IBP 38 may be trained on the indirect branch operation itself and need not receive the redirect indication in other embodiments. If the MOP 34 does not detect a mismatch in the predictions, then no redirect may be signaled. It is noted that some embodiments of the processor 12 may not include the MOP 34 and my rely on the IBP 38 and the enhancements thereto for the dynamic indirect branch instructions such as the terminating branch of the objective C message send routine.

In addition to redirecting the fetch, a misprediction detected by the MOP 34 may cause the instructions at the previously-predicted target address to be flushed. The decode/map unit 22 may manage the flushing of the instructions, e.g. using the reorder buffer and recovering the register renaming to the state prior to the flushed instructions, etc. Similarly, a misprediction detected via execution of the indirect branch instruction may cause a redirect and flush.

The decode/map unit 22 may be configured to decode the fetched instructions from the ICache 18 into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 12 may be decoded into a single instruction operation, and thus the instruction operation may be essentially synonymous with instruction (although it may be modified in form by the decoder). The term "instruction operation" may be more briefly referred to herein as "op."

The decode/map unit 22 may be configured to map the ops to speculative resources (e.g. physical registers) to permit out-of-order and/or speculative execution, and may dispatch the ops to the reservation stations 24A-24N. The ops may be mapped to physical registers in the register file 30 from the architectural registers used in the corresponding instructions. That is, the register file 30 may implement a set of physical registers that may be greater in number than the architected registers specified by the instruction set architecture implemented by the processor 12. The decode/map unit 22 may manage the mapping of the architected registers to physical registers. There may be separate physical registers for different operand types (e.g. integer, vector, floating point, etc.) in an embodiment. In other embodiments, the physical registers may be shared over operand types. The decode/map unit 22 may also be responsible for tracking the speculative execution and retiring ops or flushing misspeculated ops. A reorder buffer may be used to track the program order of ops and manage retirement/flush, for example.

Ops may be scheduled for execution when the source operands for the ops are ready. In the illustrated embodiment, decentralized scheduling is used for each of the execution units 28A-28B and the LSU 42, e.g. in the reservation stations 24A-24N. Other embodiments may implement a centralized scheduler if desired. Ops scheduled for execution may read their source operands from the register file 30 and/or ay have operands forwarded from execution of ops in the execution units 28A-28B and/or the LSU 42. The results of executing ops that have target registers may be written to the register file 30 and/or forwarded to dependent ops that have been scheduled as well.

The LSU 42 may be configured to execute load/store memory ops. Generally, a memory operation (memory op) may be an instruction operation that specifies an access to memory (although the memory access may be completed in a cache such as the data cache 16). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g. if the store data operand is provided before one or more of the store address operands. While store ops may be executed as store address and store data ops in some embodiments, other embodiments may not implement the store address/store data split.

The execution units 28A-28B may include any types of execution units in various embodiments. For example, the execution units 28A-28B may include integer, floating point, and/or vector execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Vector execution units may be configured to execute vector ops. Vector processing may be characterized by performing the same processing on significant amounts of data, where each datum is a relatively small value (e.g. 8 bits or 16 bits, compared to 32 bits to 64 bits for an integer). Thus, vector ops often include single instruction-multiple data (SIMD) or vector operations on an operand that represents multiple data items.

Thus, each execution unit 28A-28B may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of dependent ops occurs may vary based on the type of op and execution unit 28 that will be executing the op.

It is noted that any number and type of execution units 28A-28B may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g. 32 bytes, 64 bytes, 128 bytes, or larger or smaller cache lines). Different caches may have different cache line sizes. The ICache 18 and DCache 16 may each be a cache having any desired capacity, cache line size, and configuration. There may be more additional levels of cache between the DCache 16/ICache 18 and the main memory, in various embodiments.

At various points, ops are referred to as being younger or older than other ops. A first operation may be younger than a second operation if the first operation is subsequent to the second operation in program order. Similarly, a first operation may be older than a second operation if the first operation precedes the second operation in program order.

FIG. 2 is a block diagram illustrating an embodiment of the objective C message send routine 50 and an example of a method table 52 corresponding to a class. While a specific code sequence is illustrated in FIG. 2, other embodiments may use a different sequence and may still be predicted using the IBP 38 and/or the MOP 34. In the embodiment of FIG. 2, the objective C message send routine 50 is called with two arguments in the x0 and x1 registers. The x0 and x1 registers, and other registers illustrated in the routine 50, are architected registers defined in the instruction set architecture implemented by the processor 12. For example, the ARM instruction set architecture is used in this example, although other instruction set architectures may be used in other embodiments. The x0 register may store an object pointer which points to the object to which the message is being sent. The x1 register may store a selector, which may be a numerical value that corresponds to the method name. For example, the compiler used to compile objective C programs may assign selectors to the method names.

As illustrated by the arrows 54A-54C, the objective C method send routine 50 may be called by many different callers (e.g. caller1, caller2, caller3, etc.). The caller may be a call instruction at a particular PC, and each caller may have a different PC. There may be a correlation between the caller and the target of the indirect branch that exits the objective C message send routine (br x17, reference numeral 56). As mentioned above, the IBP 38, in some embodiments, may use this correlation by predicting the terminating indirect branch instruction using the previous taken PC, which in this case would be the PC of the caller.

The program order of the instructions in the routine 50 is from top to bottom as illustrated in FIG. 2. That is, a first instruction that is above a second instruction in the routine 50 as shown in FIG. 2 is prior to the second instruction in program order. Instructions may be executed out of program order, as long as dependencies between the instructions are respected.

The most frequent path through the routine 50 may include no branches until the terminating branch 56. That is, the other branches in the routine 50 before the terminating branch 56 may usually be not taken. The first two instructions of the routine, beginning with the cmp x0, #0x0, check the object pointer to make sure it is not null (address 0). A null object pointer is an error and thus should be rare. Assuming the pointer is not null, the first load instruction 58 dereferences the object pointer. That is, the x0 register is a source operand of the first load instruction 58, and the address accessed by the load is formed from the contents of the x0 register. The following "and" instruction masks non-pointer fields to extract a class pointer in register x16. A second load instruction 60 determines the start address of the method table 52 (x10) and a size (x11). The second load instruction 60 has the x16 register as a source operand, from which the address accessed by the second load instruction is formed. The pointer to the start address (x10) is illustrated at arrow 62. Based on the selector (x1, lower word w1) and the table size (x11, lower word w11), an index is generated in register w12 (arrow 64). The index is added to the table base to produce a pointer in x12 to the initial address at which searching for the selector is to begin within the method table 52 (arrow 72). A third load instruction 66 reads the selector and the implementation address from the entry indicated by x12 into registers x9 and x17, respectively. That is, the x12 register is a source operand of the third load instruction 66 and is used to form the address accessed by the third load instruction 66. The register x9 is compared to the selector (in x1), and if they compare equal (b.ne is not taken), the terminating indirect branch 56 branches to the method address (x17) to begin execution. If the selector from the entry (x9) is not equal to the selector input to the routine 50 (x1), the routine 50 branches to the bucket scan routine ("bucket_scan" label in FIG. 2) and advances the pointer to the next entry (assuming the selector in x9 does not indicate that the end of the table 52 has been reached, checked by the cbz instruction, and that the pointer has not wrapped to the beginning of the table, indicated by the cmp x12, x10 and b.eq instructions). The bucket scan routine branches back to the cmp x9, x1 instruction ("compare selector" label in FIG. 2) to compare the next selector to the input selector (in x1). If the next selector matches the input selector, the terminating indirect branch 56 is executed. If the next selector does not match the input selector, another iteration of the bucket scan portion of the routine 50 is executed. The dotted arrows 68 and 70 illustrate scanning additional selectors in successive executions of the bucket scan routine.

The loads 58, 60, and 66 are thus a dependency chain that resolves before the terminating indirect branch 56 can be executed. That is, the indirect branch 56 is indirectly dependent on the first and second loads 58 and 60, because the load 66 may not execute and load x17 until the preceding loads have executed. The indirect branch 56 is directly dependent on the load 66 because it loads x17, which is a source operand of the indirect branch 56. The loads 58, 60, and 66 may have a high data cache miss rate (especially if a new target address is being selected compared to previous executions of the routine 50), and thus the resolution of the terminating indirect branch 56 (and misprediction detection) may be significantly delayed as the processor 12 speculatively executes instructions down the wrong speculative path (in the case of misprediction). However, the target address of the terminating indirect branch instruction may be correctly predicted based on the register values input to the routine 50 (x0 and x1), if a MOP 34 large enough to encompass all combinations of the values in x0 and x1 were implemented. For more implementable sizes, the target address may be predicted with a high degree of accuracy. The accuracy may be improved by using one of the intermediate values (x16 or x10) instead of x0, at the cost of experiencing the delay of one or more of the load misses. Accordingly, in various embodiment, the contents of x0 and x1, x16 and x1, or x10 and x1 may be used to generate an index in the MOP 34. Examples using x0 and x1 or x16 and x1 are shown below, but x10 and x1 could also be used at the expense of two load miss delays.

Table 52 may be a table associated with a particular class. Other tables associated with other classes may also be used concurrently with the table 52. In an embodiment, the table 52 may be a software-cached version of a larger structure associated with the particular class. The software may manage the contents of the table 52 (e.g. instructions located as the "handler" label may be search for a missing selector in the larger structure and insert it into the table 52).

Figure 3:
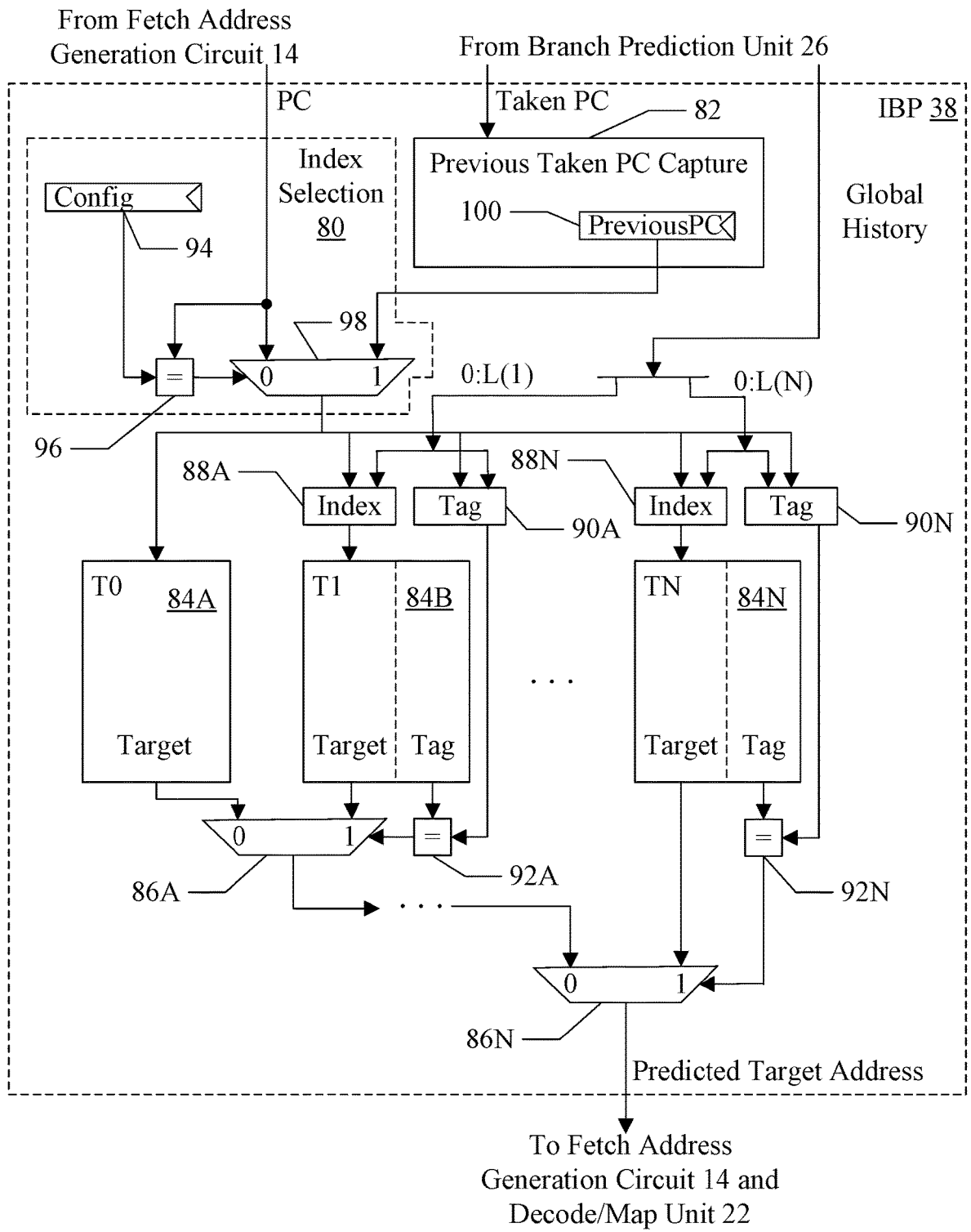
FIG. 3 is a block diagram of one embodiment of an IBP.

FIG. 3 is a block diagram illustrating a first embodiment of the IBP 38 in greater detail. In the illustrated embodiment, the IBP 38 includes an index selection circuit 80, a previous taken PC capture circuit 82, predictor memories 84A-84N, output muxes 86A-86N, index generation circuits 88A-88N, tag generation circuits 90A-90N, and comparators 92A-92N. The index selection circuit 80 is coupled to a PC from the fetch address generation circuit 14, the previous taken PC capture circuit 82, the predictor memory 84A, the index generation circuits 88A-88N, and the tag generation circuits 90A-90N. The previous taken PC capture circuit 82 is coupled to a taken PC from the branch prediction unit 26. The index generation circuits 88A-88N are coupled to global history from the branch prediction unit 26 and are coupled to respective predictor memories 84A-84N. The tag generation circuits 90A-90N are coupled to the global history and respective comparators 92A-92N. The output mux 86A is coupled to target outputs from the predictor memories 84A and 84B, and to a selection control from the comparator 82A. The output of the output mux 86A is coupled to another output mux (illustrated by ellipses in FIG. 3). The comparator 92A is coupled to a tag output from the predictor memory 84B. The output mux 86N is coupled to the output of a previous output mux (illustrated by ellipses in FIG. 3) and to the target output from the predictor memory 84N, and to a selection control from the comparator 92N. The comparator 92N is coupled to a tag output from the predictor memory 84N. The output of the output mux 86N is a predictor target address supplied to the fetch address generation circuit 14 (to correct the fetch address, if appropriate) and to the decode/map unit 22 (to provide with the indirect branch instruction, for prediction verification).

In the illustrated embodiment, the index selection circuit 80 includes a configuration register or registers 94, a comparator 96, and a mux 98. The configuration register 94 is coupled to the comparator 96, which is coupled to the PC from the fetch address generation circuit 14 and is coupled to the selection control on the mux 98. The mux 98 is coupled to the PC, and to a previous taken PC from the branch prediction unit 26. The output of the mux 98 is the output of the index selection circuit 80 the index generation circuits 88A-88N and the tag generation circuits 90A-90N. In the illustrated embodiment, the previous taken PC capture circuit 82 includes a previous PC register 100, which is the output of the previous taken PC capture circuit 82.

The configuration register(s) 94 may be programmable with data identifying the indirect branch instruction that terminates the objective C message send routine (e.g. the indirect branch 56 in FIG. 2), or any other indirect branch for which an alternate PC is to be selected for index generation. For example, a PC corresponding to the indirect branch may be used. The PC may be the PC of the indirect branch itself, the PC that is the start of the objective C message send routine, or an intermediate PC that would be used to fetch the indirect branch and one or more preceding instructions. The PC may be a partial PC (e.g. low order bits that define offsets within the routine 50 may not be used), or a full PC may be stored and, in some embodiments, a portion of the PC may be compared by the comparator 96. In an embodiment, more than one configuration register 94 and corresponding comparator 96 may be implemented to allow multiple indirect branches to be identified, and the results of the comparisons may be logically ORed together to produce the selection control for the mux 98. Any data may be used to identify the indirect branch in various embodiments, and corresponding data may be provided from the fetch address generation circuit 14 (or another component of the processor 12) for comparison. Viewed in another way, the configuration register 94 may be programmable with data that identifies a given indirect branch instruction that is being predicted by the IBP 38 as an instance of the indirect branch that terminates the objective C send routine, or an instance of another indirect branch that is to be predicted using the alternate PC.

The comparator may be configured to compare the fetch PC from the fetch address generation circuit 14 to the PC from the configuration register 94. If the PCs match, the alternate PC is to be used for indexing the IBP 38 (input 1 to the mux 98, the previous taken PC in this embodiment). If the fetch PC does not match the PC from configuration register 94, the fetch PC may be selected (input 0 to the mux 98).

The selected PC output by the index selection circuit 80 (or a portion thereof) may be used directly as an index to the predictor memory 84A in this embodiment, and the selected PC (or a portion) may be provided to the index generation circuits 88A-88N and the tag generation circuits 90A-90N. As illustrated in FIG. 3, the index generation circuits 88A-88N may be configured to hash the selected PC and differing amounts of the global history to generate indexes for their respective predictor memories 84B-84N. For example, the amount of history may increase with increasing memory number. That is, memory T1 84B may use history bits 0:L(1), and memory TN 84N may use bits 0:L(N), where L(1) and L(N) are positive integers and L(1) is less than L(N). Other memories between T1 and TN, illustrated via ellipses in FIG. 3, may use a number of history bits between L(1) and L(N). Any number of predictor memories 84A-84N may be included, in various embodiments. Additionally, a hash of PC and history, or a hash of the PC alone, may be used to index memory T0 84A, in other embodiments. Each memory 84A-84N may select an entry based on the index, and may output the contents of the entry (e.g. a branch target for memory 84A, or branch target and tag for other memories 84B-84N) as shown in FIG. 3.

Each predictor memory 84A-84N may store a plurality of indirect branch targets that have resulted from previous executions of indirect branch instructions. Training circuitry (not shown in FIG. 3) may capture the indirect targets from executing instructions and may update the memories 84A-84N based on the PCs of the instructions and the resulting indirect targets. For the indirect branches that use alternate PCs, e.g. the indirect branch 56 in FIG. 2, the alternate PC may be used for training as well. The predictor memory 84A is tagless in this embodiment, and thus may always provide an output (assuming the indexed entry in the memory 84A is valid) for a given indirect branch instruction. Memories T1 84B to TN 84N may have a tag, and thus may be a hit or miss based on the tag comparison by comparators 92A-92N. That is, each comparator 92A-92N is coupled to a tag output from the respective memory 84B-84N and is configured to compare the tag to the tag generated by the respective tag generation circuit 90A-90N. The tag may be a hash of PC and history as well, but may be a different has than the hash implemented by the index generation circuits 88A-88N. If a tag hit is detected, the comparator 92A-92N may select the output of the hitting memory through the corresponding mux 86A-86N. If a tag miss is detected, the output of the preceding output mux 86A-86B may be selected. In the case of output mux 86A, a tag miss in the memory 84B results in the selection of the output from the memory 84A. Accordingly, the hitting memory that uses the most history for indexing may output the selected target, and if no memories 84B-84N have tag hits, the output of the memory 84A is selected as the predicted target address.

The global history may be the most recent L(N)+1 taken/not taken results for branch instructions, independent of whether the branch instructions were indirect branches predicted by the IBP 38, conditional branches predicted by the BDP 36, return instructions predicted by the RAS 40, or any combination thereof. In other embodiments, other types of history may be used (e.g. PC bits from branch instructions, combinations of PC bits and taken/not taken, types of branch instructions encountered, etc.).

The IBP 38 illustrated in FIG. 3 (and other embodiments illustrated in FIGS. 4-6) may be TAGE-type predictors. Other embodiments may implement other types of predictors, employing one predictor memory or multiple predictor memories, as desired. Additionally, when more than one predictor memory is used, the various predictor memories may differ in size (that is, number of entries). For example, in one embodiment, the predictor memory 84A may be larger than the predictor memory 84B, which may be larger than other predictor memories including the predictor memory 84N. Alternatively, one or more predictor memories may be the same size or all the predictor memories may be the same size, in other embodiments.

The previous taken PC capture circuit 82 may be configured to capture the PC of the most recent taken branch instruction. As illustrated in FIG. 3, the branch prediction unit 26 may provide a taken PC for each branch instruction that is predicted taken. The previous taken PC capture circuit 82 may be configured to capture the PC in the previous PC register 100, and subsequently provide the PC to the index selection circuit 80. In the case of the objective C routine 50 shown in FIG. 2, when the indirect branch 56 is predicted for the common case in which the preceding branches in the routine 50 are not taken, the previous taken PC may be the PC of the calling instruction. Accordingly, the alternate PC for the indirect branch 56 may be the PC of the calling instruction in the common case. As mentioned above, there may be a correlation between the caller and the indirect branch target address. Additionally, using the PC of the caller may provide more locations in the branch prediction memories 84A-84N for the targets of the indirect branch 56, allowing more targets to be predicted. In the less common case that one of the other branches that precedes the branch 56 in the routine 50 is taken, the alternate PC may not be as correlated to the indirect branch target address, in an embodiment.

It is noted that, while the taken PC is provided to the previous taken PC capture circuit 82 in the illustrated embodiment, in another embodiment the PC from the fetch address generation circuit 14 may be provided to the previous taken PC capture circuit 82. The branch prediction unit 26 may provide an indication of taken/not taken predictions (where a non-branch instruction may be inherently not taken). The previous taken PC capture circuit 82 may capture the PC when the taken/not taken prediction indicates taken.

It is noted that, while various elements have been labeled with A to N suffixes to indicate that there may be any number of the corresponding elements in various embodiments, the number of elements may differ from other elements also designated with the A to N suffixes. For example, the output muxes 86A-86N may be one fewer in number than the memories 84A-84N. That is, if there were three memories 84A-84N, there would be two output muxes 86A-86N, one mux 86A coupled a shown in FIG. 3 and another mux 86N having the output of mux 86A as an input and the output of memory 84N as an input.

Figure 4:
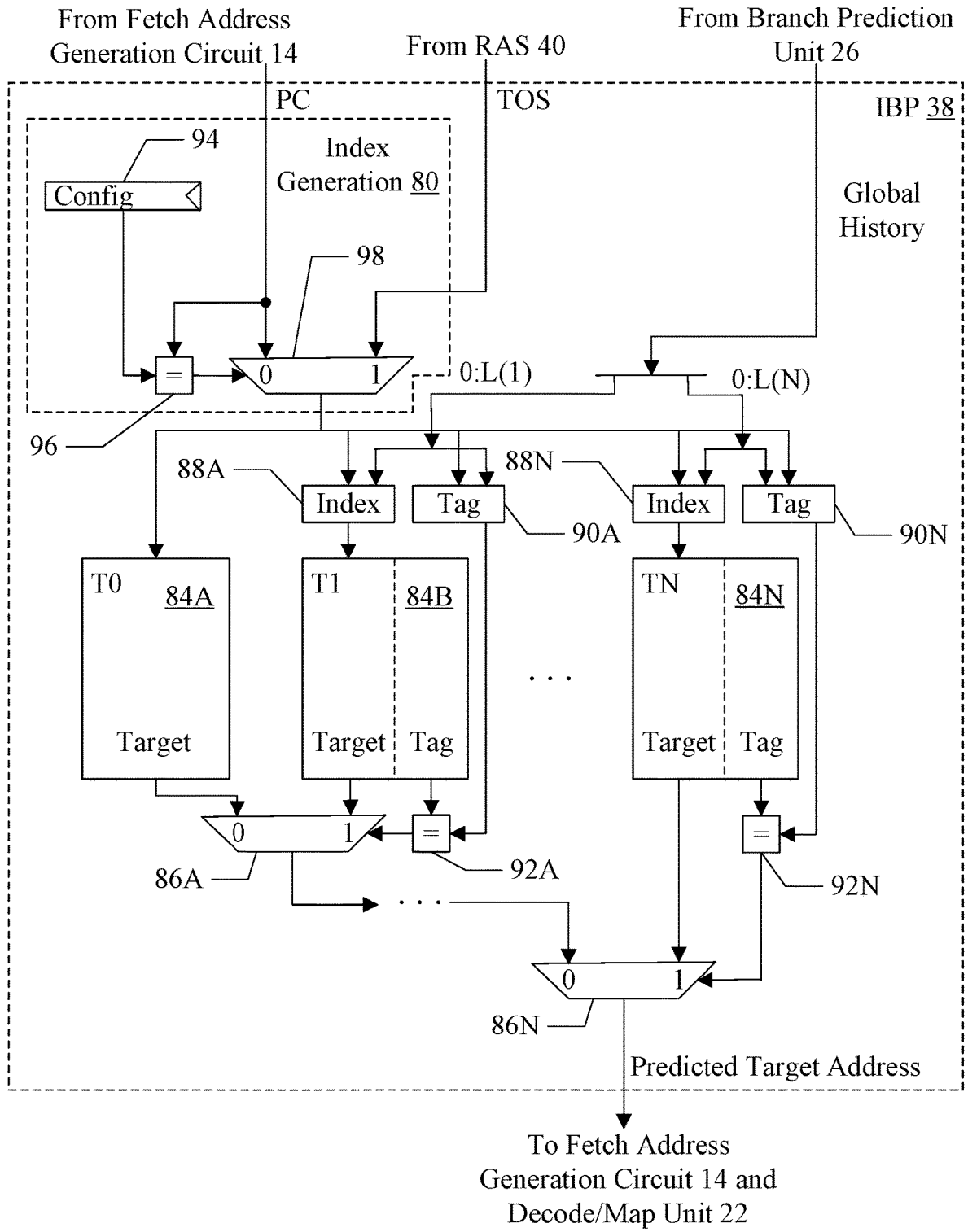
FIG. 4 is a block diagram of a second embodiment of an IBP.

FIG. 4 is another embodiment of the IBP 38. In the illustrated embodiment, the IBP 38 includes a similar predictor memory structure to the embodiment of FIG. 3 with the memories 84A-84N, output muxes 86A-86N, index generation circuits 88A-88N, tag generation circuits 90A-90N, and comparators 92A-92N coupled and configured similar to the above discussion. In this embodiment, however, the alternate PC may be the top of stack provided by the RAS 40. That is, the mux 98 may select between the PC (for indirect branch instructions that do not match the data in the configuration register 94) and the top of stack address from the RAS (for indirect branch instructions that do match the data in the configuration register 94). Since the routine 50 is a function/subroutine, the calling instruction may be a subroutine call instruction and the return address to the instruction after the call instruction may be at the top of the stack when the indirect branch 56 is fetched, in an embodiment.

Figure 5:
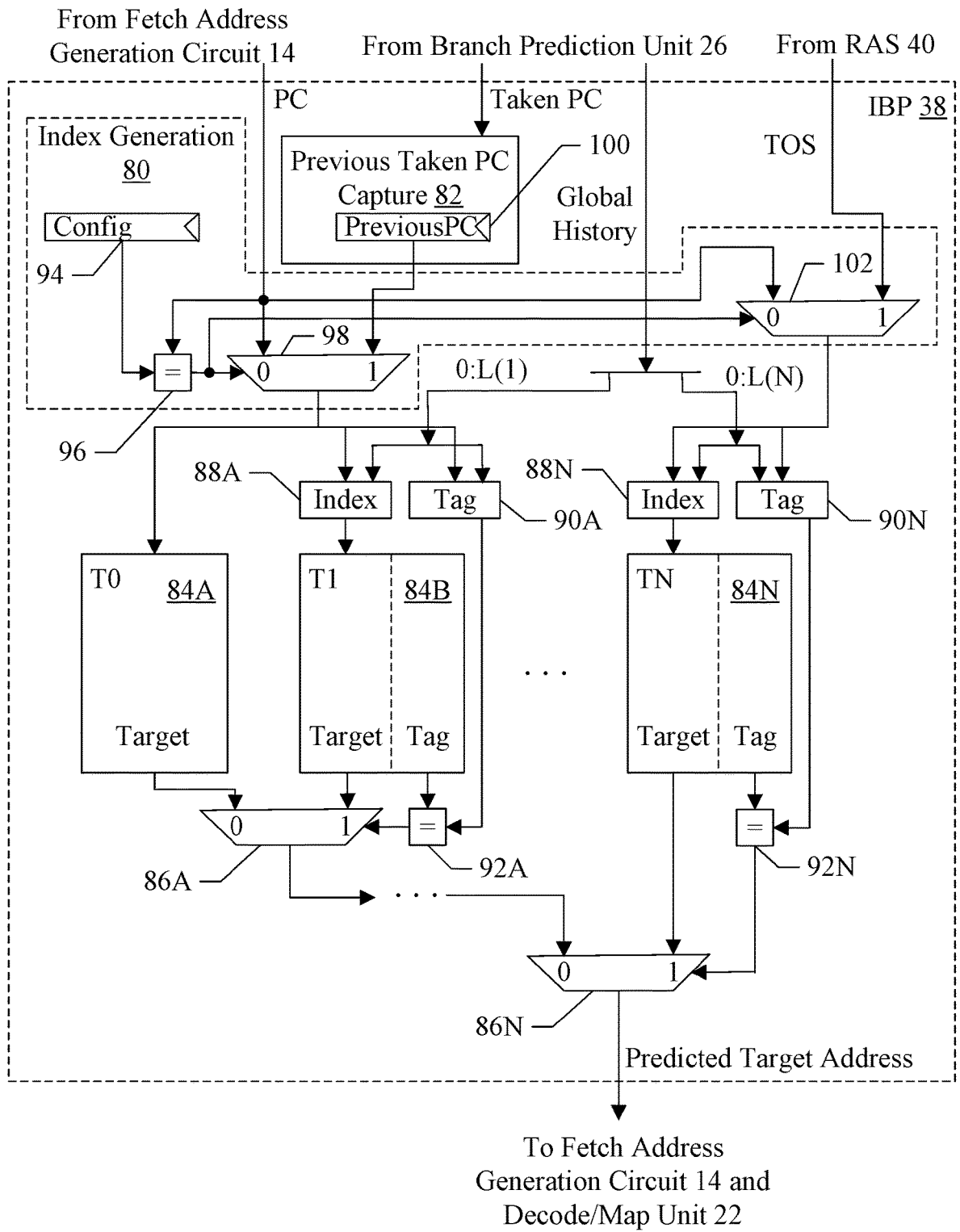
FIG. 5 is a block diagram of a third embodiment of an IBP.

In some cases, not all calling instructions are subroutine call instructions that are tracked by the RAS 40. An embodiment that combines the alternate PCs from the embodiments of FIGS. 3 and 4 may be used to attempt to balance the cases that are predicted more accurately by the top of stack address and the cases that are predicted more accurately using the previous taken PC. For example, the previous taken PC may be used to index a subset of the memories 84A-84N, and the top of stack address may be used to index another, non-overlapping subset of the memories 84A-84N. That is, each of the memories 84A-84N may be in one of the subsets and not in the other one of the subsets. Any division of the memories 84A-84N may be used. For example, FIG. 5 is an embodiment in which memories 84A-84N that use smaller amounts of history or no history may be in one subset that is indexed based on the previous taken PC, and the memories 84A-84N that use larger amounts of history are in the subset that is indexed based on the top of stack address. In particular, the memories 84A-84B may be indexed based on the previous taken PC and the remaining memories, including the memory 84N, may be indexed based on the top of stack address for one implementation. Other implementations may use other subsets, e.g. the subsets may be interleaved with even numbered memories in one subset (T1, T2, etc.) and odd numbered memories in another subset (T1, T3, etc.), the subset using smaller amounts of history may be indexed based on the top of stack address and the subset using larger amounts of history may be indexed based on the previous taken PC, etc.

Accordingly, in the embodiment of FIG. 5, the IBP 38 again includes a similar predictor memory structure to the embodiment of FIG. 3 with the memories 84A-84N, output muxes 86A-86N, index generation circuits 88A-88N, tag generation circuits 90A-90N, and comparators 92A-92N coupled and configured similar to the above discussion. However, in this embodiment the index selection circuit 80 outputs a selected address for each subset of memories 84A-84N. In FIG. 5, the mux 98 may select between the current PC and the previous taken PC and may provide the selected address to the memory 84A, the index generation circuit 88A, and the tag generation circuit 90A. A mux 102 may select between the current PC and the top of stack address and may provide the selected address to the remaining index generation circuits/tag generation circuits including circuits 88N and 90N.

Figure 6:
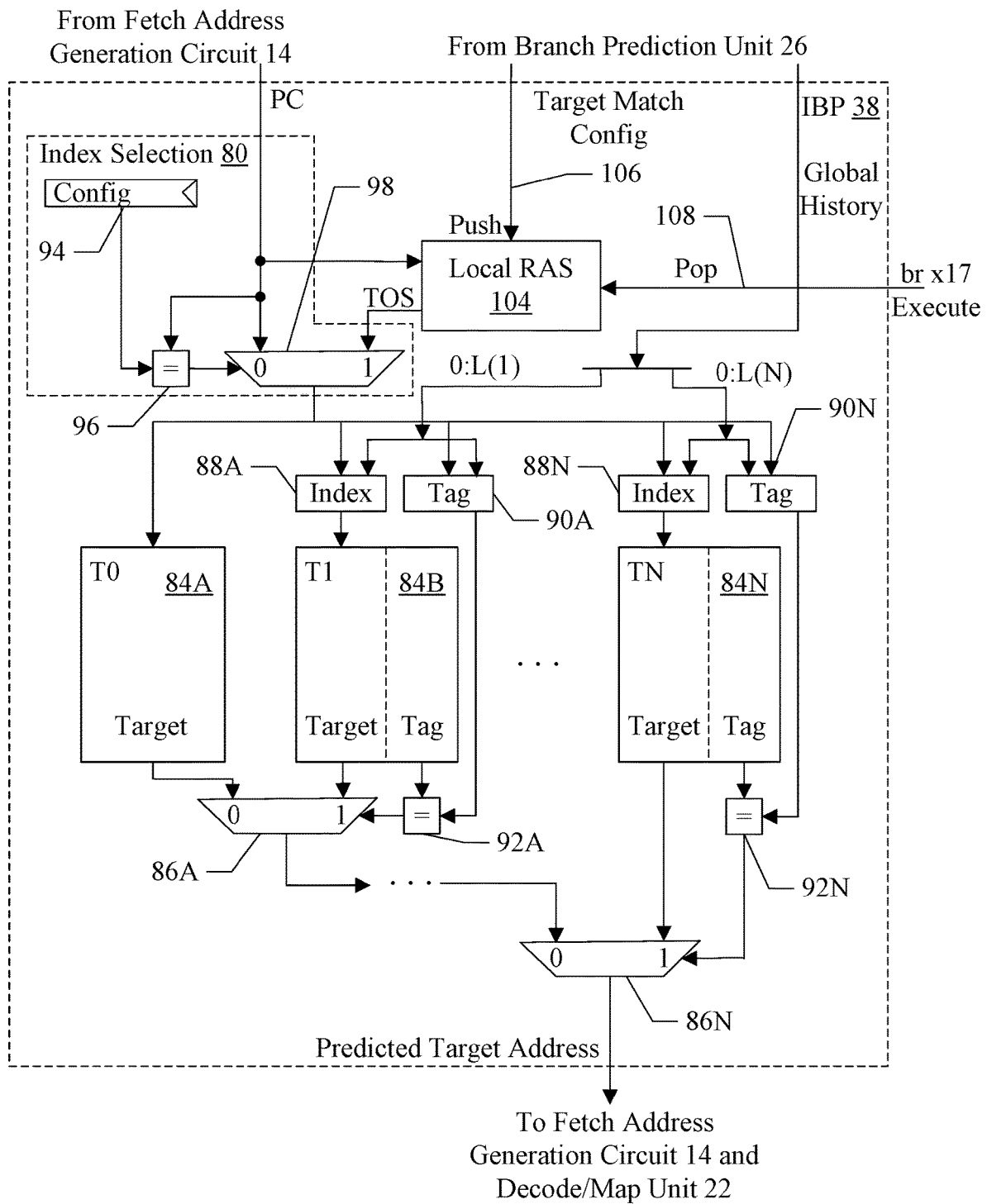
FIG. 6 is a block diagram of a fourth embodiment of an IBP.

In another embodiment, the IBP 38 may implement a return address stack structure similar to the RAS predictor 40 but dedicated to the indirect branch 56 or other indirect branch to be predicted using an alternate PC. FIG. 6 is an example of such an embodiment. In the embodiment of FIG. 6, the IBP 38 again includes a similar predictor memory structure to the embodiment of FIG. 3 with the memories 84A-84N, output muxes 86A-86N, index generation circuits 88A-88N, tag generation circuits 90A-90N, and comparators 92A-92N coupled and configured similar to the above discussion. The PC from the fetch address generation circuit 14 may be provided as an input to a local RAS 104. The top of stack address from the RAS 104 may be an input to the mux 98 and may be selected through the mux 98 when the PC matches the PC from the configuration register 94. The PC may be pushed onto the local RAS when the PC corresponds to a taken branch for which the target matches the PC of the routine 50 (e.g. the PC may be in the configuration register 94 or a similar configuration register in the branch prediction unit 26). The signal indicating the target matches the address in the configuration register (reference numeral 106 in FIG. 6) may be the push control to the local RAS 104. The pop control may be detection of the indirect branch 56 (br x17) executing in the processor 12 (reference numeral 108 in FIG. 6).

Thus, the embodiment of FIG. 6 may mimic the call behavior to the message send routine, but since the calls are detected based on target address and not the specific instruction that branches to the routine 50, the local RAS 104 may be more accurate the RAS 40 for cases in which not all calls to the routine 50 use a subroutine call instruction.

It is noted that, while the embodiments of FIGS. 3-6 use one or more configuration registers to identify indirect branch instructions for which the alternate PC is selected to use for index generation in the IBP 38, other embodiments may employ other mechanisms. For example, circuitry to track the behavior of various indirect branch instructions and detect which instructions vary their target addresses frequently and/or among a large number of targets may be used to identify indirect branch instructions for which the alternate PC is selected.

Figure 7:
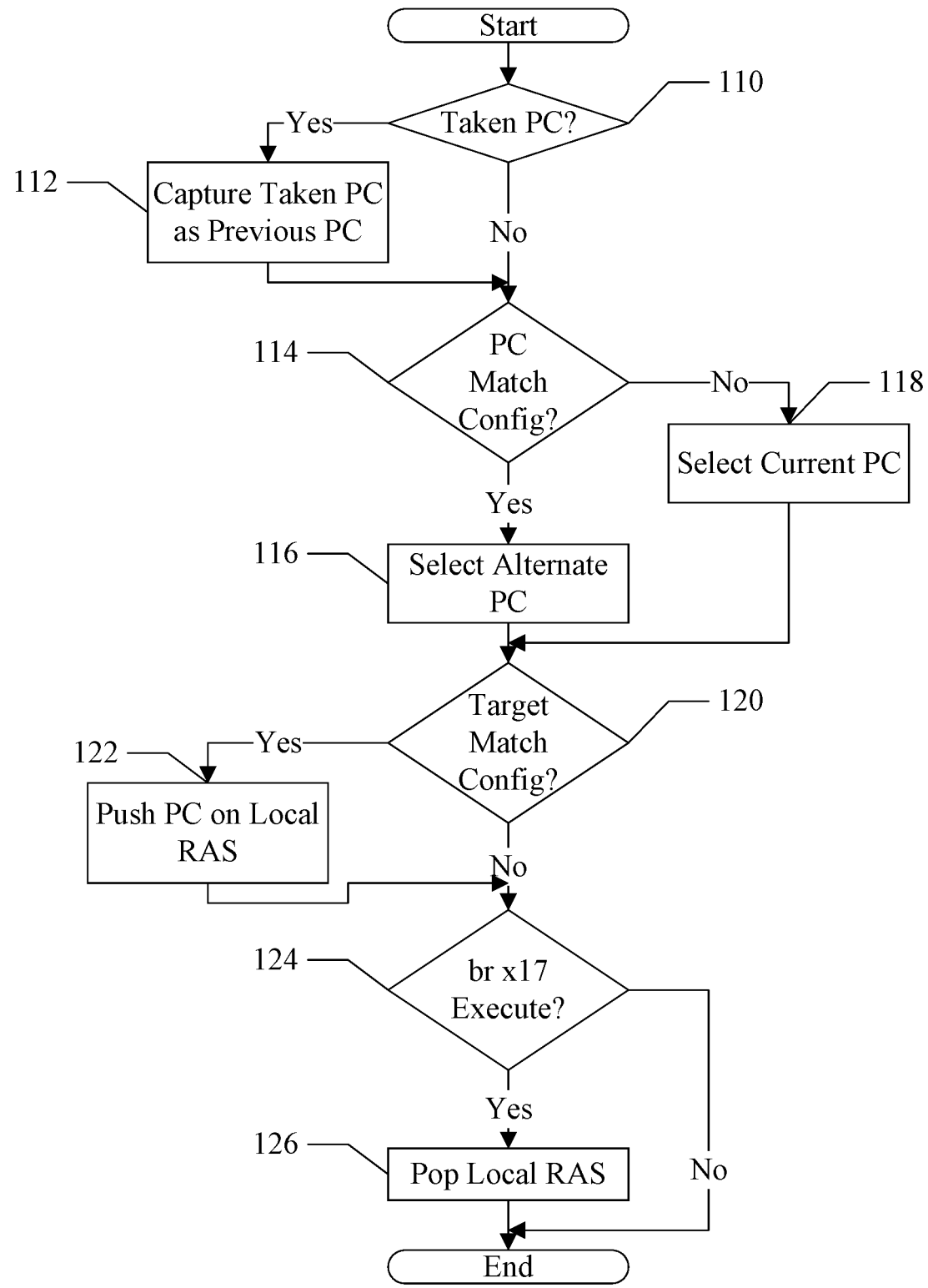
FIG. 7 is a flowchart illustrating operation of one embodiment of the IBP.

FIG. 7 is a flow chart illustrating certain operation of various embodiments of the IBP 38. While the blocks are shown in a particular order for ease of understanding, other orders may be used. Blocks may be performed in parallel in combinatorial logic in the IBP 38. Blocks, combinations of blocks, and/or the flowchart as a whole may be pipelined over multiple clock cycles in the IBP 38. The IBP 38 may be configured to implement the operation illustrated in FIG. 7. FIG. 7 illustrates certain aspects that pertain to only some of the embodiments described above, as will be clear from the discussion below.

In embodiments that include the previous taken PC capture circuit 82 (e.g. the embodiments of FIGS. 3 and 5), if a taken PC is indicated from the branch prediction unit 26 (decision block 110, "yes" leg), the previous taken PC capture circuit 82 may be configured to capture the PC and output the PC as the previous taken PC in a subsequent clock cycle (block 112).

If the PC matches the PC in the configuration register 94 (decision block 114, "yes" leg), the index selection circuit 80 may be configured to select the alternate PC (block 116). The alternate PC may be the previous taken PC, for example, in the embodiment of FIG. 3. The alternate PC may be the top of stack address from the RAS 40 (embodiment of FIG. 4) or the local RAS 104 (embodiment of FIG. 6). The alternate PC may be one of the previous taken PC or the top of stack address from the RAS 40, depending on the prediction memory 84A-84N (embodiment of FIG. 5). Other embodiments may use other alternate PCs as well. If the PC does not match the PC in the configuration register 94 (decision block 114, "no" leg), the index selection circuit 80 may be configured to select the current PC from the fetch address generation circuit 14 (block 118).

For embodiments that implement a local RAS 104 (e.g. the embodiment of FIG. 6), if a target of a branch matches the PC in the configuration register 94, or a similar configuration register provided in the branch prediction unit 26 (decision block 120, "yes" leg), the local RAS 104 may push the PC on the stack (block 122). If the indirect branch 56

(e.g. br x17) executes (decision block 124, "yes" leg), the local RAS 104 may pop the top of the stack (block 126).

Figure 8:
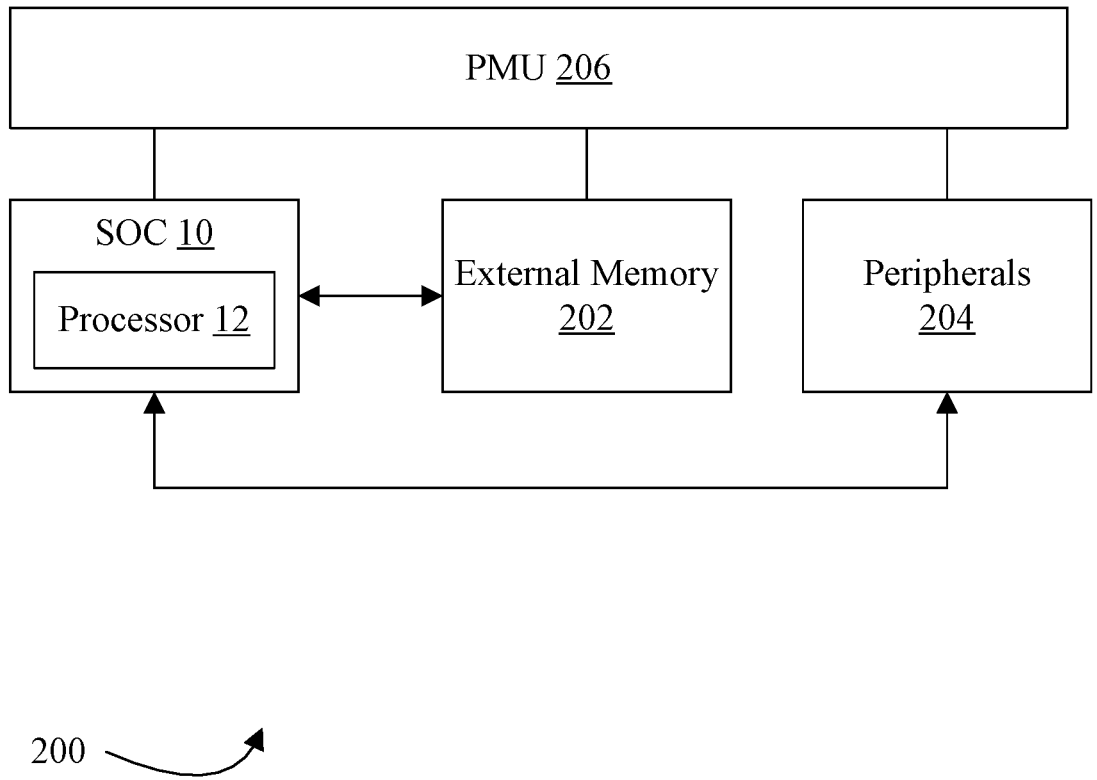
FIG. 8 is a block diagram of one embodiment of a system including the processor shown in FIG. 1.

FIG. 8 is a block diagram of one embodiment of a system 200. In the illustrated embodiment, the system 200 includes at least one instance of an integrated circuit (IC) 10, which may be a system on a chip (SOC) 10 in this embodiment, coupled to one or more peripherals 204 and an external memory 202. A power supply 206 is provided which supplies the supply voltages to the SOC 10 as well as one or more supply voltages to the memory 202 and/or the peripherals 204. The SOC 10 may include one or more instances of the processor 12. In other embodiments, multiple SOCs 10 may be provided with instances of the processor 12 included in them.

The peripherals 204 may include any desired circuitry, depending on the type of system 200. For example, in one embodiment, the system 200 may be a computing device (e.g., personal computer, laptop computer, etc.), a mobile device (e.g., personal digital assistant (PDA), smart phone, tablet, etc.), or an application specific computing device. In various embodiments of the system 200, the peripherals 204 may include devices for various types of wireless communication, such as wifi, Bluetooth, cellular, global positioning system, etc. The peripherals 204 may also include additional storage, including RAM storage, solid state storage, or disk storage. The peripherals 204 may include user interface devices such as a display screen, including touch display screens or multitouch display screens, keyboard or other input devices, microphones, speakers, etc. In other embodiments, the system 200 may be any type of computing system (e.g. desktop personal computer, laptop, workstation, net top etc.).

The external memory 202 may include any type of memory. For example, the external memory 202 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 202 may include one or more memory modules to which the memory devices are mounted, such as single inline memory modules (SIMMs), dual inline memory modules (DIMMs), etc. Alternatively, the external memory 202 may include one or more memory devices that are mounted on the SOC 10 in a chip-on-chip or package-on-package implementation.

Figure 9:
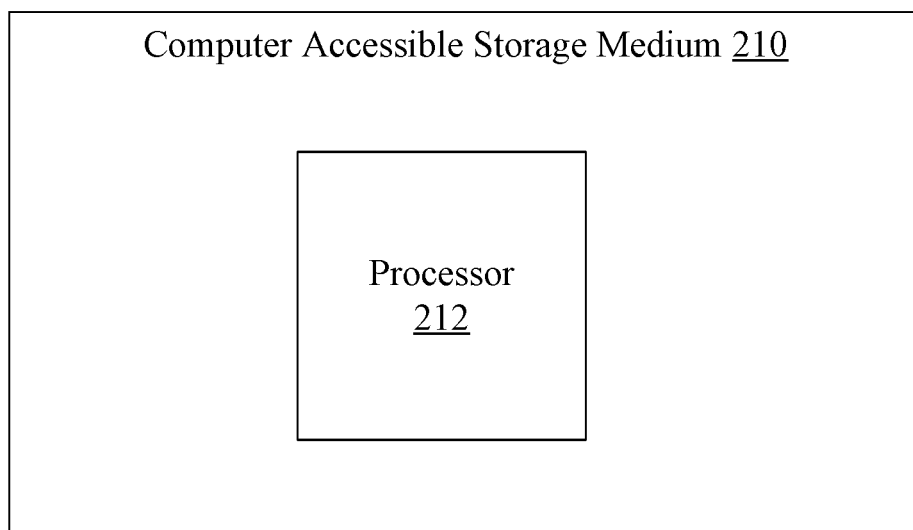
FIG. 9 is a block diagram of one embodiment of a computer accessible storage medium.

Turning now to FIG. 9, a block diagram of one embodiment of a computer readable storage medium 210 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 210 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 210 in FIG. 8 may store a database 212 representative of the processor 12. Generally, the database 212 may be a database which can be read by a program and used, directly or indirectly, to fabricate the hardware comprising the processor 12. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processor 12. The netlist may then be placed and routed to produce a data set describing geometric shapes to be applied to masks. The masks may then be used in various semiconductor fabrication steps to produce a semiconductor circuit or circuits corresponding to the processor 12. Alternatively, the database 212 on the computer accessible storage medium 210 may be the netlist (with or without the synthesis library) or the data set, as desired.

While the computer accessible storage medium 210 stores a representation of the processor 12, other embodiments may carry a representation of any portion of the processor 12, as desired, including any subset of the components shown in FIG. 1. The database 212 may represent the SOC 10 or any portion thereof. The database 212 may represent any portion of the above.

In accordance with the above description, various embodiments of an indirect branch predictor have been disclosed. The indirect branch predictor may comprise one or more memories configured to store target addresses of indirect branch instructions previously executed by a processor that includes the indirect branch predictor. The indirect branch predictor may further comprise an index selection circuit coupled to the one or more memories and configured to select at least a first address. The indirect branch predictor may be configured to generate at least one index into the one or more memories for a first indirect branch instruction based on the first address. The index selection circuit may be configured to select between a first fetch address corresponding to the indirect branch instruction and a second fetch address different from the first fetch address to generate the at least one index. The index selection circuit may be configured to select the second fetch address as the first address responsive to identifying the first indirect branch instruction as an instance of a second indirect branch instruction. The index selection circuit may be configured to select the first fetch address as the first address responsive to the first indirect branch instruction not being the instance of the second indirect branch instruction. The index selection circuit may further comprise a register programmable with a third fetch address corresponding to the second indirect branch instruction. The index selection circuit may be configured to identify the first indirect branch instruction as the instance of the second indirect branch instruction responsive to the first fetch address matching the third fetch address. In an embodiment, the second fetch address may correspond to a previous predicted taken branch instruction. The previous predicted taken branch instruction was fetched prior to the first indirect branch instruction. In an embodiment, the indirect branch predictor further comprises a capture circuit having a second register. The capture circuit may be configured to capture the second fetch address in the register. The capture circuit may be coupled to the index selection circuit and may be configured to provide the second fetch address to the index selection circuit. The index selection circuit may be configured to receive a top of stack address from a return address stack predictor. In an embodiment, the one or more memories are a plurality of memories and the index selection circuit is configured to select the second fetch address as the first address for a first subset of the plurality of memories. The index selection circuit is further configured, in such an embodiment, to select the top of stack address from which to generate an index a second subset of the plurality of memories. In another embodiment, the second fetch address is a top of stack address received from a return address stack predictor. In another embodiment, the indirect branch predictor further comprises a return address stack predictor. The return address stack predictor may be configured to push the first fetch address onto the return address stack responsive to detecting that a target address of a branch instruction at the first fetch address matches a routine that includes the second indirect branch instruction. The return address stack predictor may be configured to pop the first fetch address responsive to execution of the instance of the second indirect branch instruction.

In an embodiment, a processor comprises a fetch address generation circuit configured to generate fetch addresses to fetch instructions from an instruction cache. In the embodiment, an indirect branch predictor is coupled to the fetch address generation circuit. The indirect branch predictor may comprise at least one memory configured to store target addresses of previously executed indirect branch instructions. The indirect branch predictor may further comprise a first register that is programmable with data to identify a specific indirect branch instruction. The indirect branch predictor may be configured to generate an index into the at least one memory based on a first address to generate a prediction for a first indirect branch instruction. The indirect branch predictor nay be configured to select the first address from a plurality of addresses, wherein the indirect branch predictor may be configured to select the first address based on whether or not the first indirect branch instruction is the specific indirect branch instruction. In an embodiment, the plurality of addresses comprise a first fetch address corresponding to the indirect branch instruction. The indirect branch predictor may be configured to select the first fetch address as the first address responsive to the first indirect branch instruction not being the specific indirect branch instruction. In an embodiment, the plurality of addresses comprise a second fetch address corresponding to a previously-fetched, predicted-taken branch instruction. The indirect branch predictor may be configured to select the second fetch address as the first address responsive to the first indirect branch instruction being the specific indirect branch instruction. In another embodiment, the processor further comprises a return address stack predictor. The plurality of addresses may comprise a top of stack address from the return stack predictor, and the indirect branch predictor may be configured to select the top of stack address as the first address responsive to the first indirect branch instruction being the specific indirect branch instruction. In an embodiment, the indirect branch predictor further comprises a return address stack predictor dedicated to a routine that includes the specific indirect branch instruction. The indirect branch predictor may be configured to push return addresses on the return address stack predictor responsive to branches to the routine and pop addresses from the return address stack predictor responsive to executing the specific indirect branch instruction. The plurality of addresses may include a top of stack address from the return address stack predictor. The indirect predictor may be configured to select the top of stack address responsive to the first indirect branch instruction being the specific indirect branch instruction. In an embodiment, the at least one memory is a plurality of memories. The indirect branch predictor may be configured to provide the first address to generate the index to a subset of the plurality of memories, and wherein the indirect branch predictor may be configured to provide a second address of the plurality of addresses to generate the index to remaining ones of the plurality of memories responsive to the first indirect branch instruction being the specific indirect branch instruction. The indirect branch predictor may be configured to provide the first address to generate the index to the remaining ones of the plurality of memories responsive to the first indirect branch instruction not being the specific branch instruction.

In an embodiment, a method comprises: receiving a fetch address corresponding to a first indirect branch instruction to an indirect branch predictor to predict a first target address of the first indirect branch instruction; and indexing one or more memories in the indirect branch predictor to determine the first target address to predict for the first indirect branch instruction, wherein the indexing is modified from the indexing used for other indirect branch instructions responsive to detecting that the first indirect branch instruction is a specific indirect branch instruction. In an embodiment, the indexing is modified by selecting a different address from a plurality of addresses to use for the indexing when the first indirect branch instruction is the specific indirect branch instruction, wherein the different address is different from a first address selected to use for indexing when the first indirect branch instruction is not the specific indirect branch instruction. In an embodiment, the different address is associated with a previously-predicted taken branch instruction.

Numerous variations and modifications will become apparent to those skilled in the art once the above disclosure is fully appreciated. It is intended that the following claims be interpreted to embrace all such variations and modifications.

What is claimed is:
1. An indirect branch predictor comprising:
one or more memories configured to store target addresses of indirect branch instructions previously executed by a processor that includes the indirect branch predictor; and
an index selection circuit coupled to the one or more memories and configured to select at least a first address, wherein the indirect branch predictor is configured to generate at least one index into the one or more memories for a first indirect branch instruction based on the first address, wherein the index selection circuit is configured to select between a first fetch address corresponding to an indirect branch instruction and a second fetch address different from the first fetch address as the first address used to generate the at least one index, wherein the index select circuit is configured to select the second fetch address as the first address responsive to identifying the first indirect branch instruction as an instance of a specific indirect branch instruction, and wherein the index selection circuit is configured to select the first fetch address as the first address responsive to the first indirect branch instruction not being the instance of the specific indirect branch instruction; and the one or more memories are configured to output a given target address based on the at least one index generated from the first address, and wherein the indirect branch predictor is configured to provide the given target address as a predicted target address for the first indirect branch instruction.

2. The indirect branch predictor as recited in claim 1 wherein the index selection circuit comprises a register programmable with a third fetch address corresponding to the specific indirect branch instruction, wherein the index selection circuit is configured to identify the first indirect branch instruction as the instance of the specific indirect branch instruction responsive to the first fetch address matching the third fetch address.

3. The indirect branch predictor as recited in claim 1 wherein the second fetch address corresponds to a previous predicted taken branch instruction, wherein the previous predicted taken branch instruction was fetched prior to the first indirect branch instruction.

4. The indirect branch predictor as recited in claim 3 further comprising a capture circuit having a second register, wherein the capture circuit is configured to capture the second fetch address in the second register, and wherein the capture circuit is coupled to the index selection circuit and is configured to provide the second fetch address to the index selection circuit.

5. The indirect branch predictor as recited in claim 4 wherein the index selection circuit is further configured to receive a top of stack address from a return address stack predictor, and wherein the one or more memories are a plurality of memories, and wherein the index selection circuit is configured to select the second fetch address as the first address for a first subset of the plurality of memories and to select the top of stack address from which to generate an index into a second subset of the plurality of memories.

6. The indirect branch predictor as recited in claim 1 wherein the second fetch address is a top of stack address received from a return address stack predictor.

7. The indirect branch predictor as recited in claim 1 further comprising a return address stack predictor, wherein a top of stack address in the return address stack predictor is the second fetch address, and wherein the return address stack predictor is configured to push the first fetch address onto the return address stack predictor responsive to detecting that a target address of a branch instruction at the first fetch address matches a routine that includes the specific indirect branch instruction.

8. The indirect branch predictor as recited in claim 7 wherein the return address stack predictor is configured to pop the first fetch address responsive to execution of the instance of the specific indirect branch instruction.

9. A processor comprising:
a fetch address generation circuit configured to generate fetch addresses to fetch instructions from an instruction cache; and
an indirect branch predictor coupled to the fetch address generation circuit, wherein the indirect branch predictor comprises at least one memory configured to store target addresses of previously executed indirect branch instructions, and wherein the indirect branch predictor comprises a first register that is programmable with data to identify a specific indirect branch instruction, and wherein the indirect branch predictor is configured to generate an index into the at least one memory based on a first address, and wherein the at least one memory is configured to output a predicted target address for a first indirect branch instruction based on the index, wherein the indirect branch predictor is configured to select the first address from a plurality of addresses, and wherein the indirect branch predictor is configured to select the first address based on whether or not the first indirect branch instruction is the specific indirect branch instruction.

10. The processor as recited in claim 9 wherein the plurality of addresses comprise a first fetch address corresponding to the first indirect branch instruction, and wherein the indirect branch predictor is configured to select the first fetch address as the first address responsive to the first indirect branch instruction not being the specific indirect branch instruction.

11. The processor as recited in claim 9 wherein the plurality of addresses comprise a second fetch address corresponding to a previously-fetched, predicted-taken branch instruction, and wherein the indirect branch predictor is configured to select the second fetch address as the first address responsive to the first indirect branch instruction being the specific indirect branch instruction.

12. The processor as recited in claim 9 further comprising a return address stack predictor, wherein the plurality of addresses comprise a top of stack address from the return address stack predictor, and wherein the indirect branch predictor is configured to select the top of stack address as the first address responsive to the first indirect branch instruction being the specific indirect branch instruction.

13. The processor as recited in claim 9 wherein the indirect branch predictor further comprises a return address stack predictor dedicated to a routine that includes the specific indirect branch instruction, wherein the indirect branch predictor is configured to push return addresses on the return address stack predictor responsive to branches to the routine and pop addresses from the return address stack predictor responsive to executing the specific indirect branch instruction.

14. The processor as recited in claim 13 wherein the plurality of addresses include a top of stack address from the return address stack predictor.

15. The processor as recited in claim 14 wherein the indirect branch predictor is configured to select the top of stack address responsive to the first indirect branch instruction being the specific indirect branch instruction.

16. The processor as recited in claim 9 wherein the at least one memory comprises a plurality of memories, and wherein the indirect branch predictor is configured to provide the first address to generate the index to a subset of the plurality of memories, and wherein the indirect branch predictor is configured to provide a second address of the plurality of addresses to generate the index to remaining ones of the plurality of memories responsive to the first indirect branch instruction being the specific indirect branch instruction.

17. The processor as recited in claim 16 wherein the indirect branch predictor is configured to provide the first address to generate the index to the remaining ones of the plurality of memories responsive to the first indirect branch instruction not being the specific indirect branch instruction.

18. A method comprising:
receiving a fetch address corresponding to a first indirect branch instruction in an indirect branch predictor to predict a first target address of the first indirect branch instruction;
detecting whether or not the first indirect branch instruction is a specific indirect branch instruction; and indexing one or more memories in the indirect branch predictor to output the first target address predicted for the first indirect branch instruction, wherein the indexing is based on the fetch address of the first indirect branch instruction responsive to detecting that the first indirect branch instruction is not the specific indirect branch instruction, and wherein the indexing is based on a different address than the fetch address responsive to detecting that the first indirect branch instruction is the specific indirect branch instruction.

19. The method as recited in claim 18 further comprising selecting the different address from a plurality of addresses for the indexing.

20. The method as recited in claim 19 wherein the different address is associated with a previously-predicted taken branch instruction.

* * * * *